(12) United States Patent
Ferraro et al.

(10) Patent No.: US 11,019,139 B2
(45) Date of Patent: May 25, 2021

(54) RANKED SESSION AFFINITY TO IMPROVE LOAD BALANCING EFFICIENCY FOR STATEFUL REQUESTS

(71) Applicant: Red Hat, Inc., Raleigh, NC (US)

(72) Inventors: Paul M. Ferraro, Boston, MA (US); Radoslav Husar, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 242 days.

(21) Appl. No.: 15/991,538

(22) Filed: May 29, 2018

(65) Prior Publication Data

US 2019/0373053 A1    Dec. 5, 2019

(51) Int. Cl.
*H04L 29/08*    (2006.01)

(52) U.S. Cl.
CPC ...... *H04L 67/1025* (2013.01); *H04L 67/1027* (2013.01); *H04L 67/146* (2013.01); *H04L 67/32* (2013.01)

(58) Field of Classification Search
CPC ............. H04L 67/1025; H04L 67/1027; H04L 67/146; H04L 67/32
See application file for complete search history.

(56) References Cited

U.S. PATENT DOCUMENTS

| 8,051,179 | B2 | 11/2011 | Angal et al. | |
| 9,785,480 | B2 | 10/2017 | Kamawat et al. | |
| 2003/0131041 | A1* | 7/2003 | Dinker | G06F 9/52 718/104 |
| 2013/0054822 | A1* | 2/2013 | Mordani | H04L 67/1034 709/228 |

(Continued)

FOREIGN PATENT DOCUMENTS

| CN | 107454155 A | 12/2017 |
| CN | 107528777 A | 12/2017 |
| EP | 1963985 A1 | 7/2016 |

OTHER PUBLICATIONS

Author Unknown, "What is an Application Load Balancer," Elastic Load Balancing, docs.aws.amazon.com/elasticloadbalancing/latest/application/introduction.html, accessed Mar. 27, 2018, Amazon Web Services, Inc., 4 pages.

(Continued)

*Primary Examiner* — Suraj M Joshi

(74) *Attorney, Agent, or Firm* — Withrow & Terranova, PLLC

(57) ABSTRACT

Ranked session affinity to improve load balancing efficiency for stateful services is disclosed. A first application server node receives, from a load balancer node, an initial request for a stateful service originating from a client node. The first application server node establishes a session based on the initial request, the session including a session identifier that uniquely identifies the session. The first application server node determines a prioritization list that identifies a set of application server nodes selected from a plurality of application server nodes, the prioritization list identifying the first application server node as a primary application server node and one or more backup application server nodes. The first application server node generates a first response to the initial request, the first response including the prioritization list. The first application server node sends the first response to the load balancer node.

21 Claims, 9 Drawing Sheets

(56) References Cited

U.S. PATENT DOCUMENTS

2016/0373520 A1* 12/2016 Kumar ................ H04L 67/1002

OTHER PUBLICATIONS

Author Unknown, "Sun Java System Web Server 7.0," Administrator's Guide, Update 7, docs.oracle.com/cd/E19146-01/821-0793/gehir/index.html, accessed on Mar. 27, 2018, Oracle Corporation, 3 pages.

Fujino, Keiichi, "Tomcat Cluster," Apachecon Europe Presentation, Oct. 1, 2015, 45 pages.

* cited by examiner

RANKED SESSION AFFINITY TO IMPROVE LOAD BALANCING EFFICIENCY FOR STATEFUL REQUESTS

TECHNICAL FIELD

The examples relate generally to load balancing efficiency, and in particular to ranked session affinity to improve load balancing efficiency for stateful requests.

BACKGROUND

Load balancer nodes attempt to relatively evenly distribute requests among a plurality of nodes. Where stateful services are being provided by the nodes, a session may be generated by a node to thereby maintain state information, and to detect related stateful requests from a user node. Because successive requests in a session may be serviced by different nodes, the state information for a session may be communicated from one node to another node during the duration of the session.

SUMMARY

The examples implement a ranked (i.e., prioritized) session affinity to improve load balancing efficiency for stateful requests.

In one example a method is provided. The method includes receiving, by a first application server node from a load balancer node, an initial request for a stateful service originating from a client node. The method further includes establishing a session based on the initial request, the session including a session identifier that uniquely identifies the session. The method further includes determining a prioritization list that identifies a set of application server nodes selected from a plurality of application server nodes, the prioritization list identifying the first application server node as a primary application server node and one or more backup application server nodes. The method further includes generating a first response to the initial request, the first response including the prioritization list, and sending the first response to the load balancer node.

In another example a system is provided. The system includes one or more computing devices, each computing device comprising a memory and a processor device coupled to the memory. The processor device of one of the one or more computing devices is to receive, by a first application server node from a load balancer node, an initial request for a stateful service originating from a client node. The processor device is further to establish a session based on the initial request, the session including a session identifier that uniquely identifies the session. The processor device is further to determine a prioritization list that identifies a set of application server nodes selected from a plurality of application server nodes, the prioritization list identifying the first application server node as a primary application server node and one or more backup application server nodes. The processor device is further to generate a first response to the initial request, the first response including the prioritization list. The processor device is further to send the first response to the load balancer node.

In another example a computer program product is provided. The computer program product includes instructions to cause one or more processor devices to receive, by a first application server node from a load balancer node, an initial request for a stateful service originating from a client node. The instructions further cause the one or more processor devices to establish a session based on the initial request, the session including a session identifier that uniquely identifies the session. The instructions further cause the one or more processor devices to determine a prioritization list that identifies a set of application server nodes selected from a plurality of application server nodes, the prioritization list identifying the first application server node as a primary application server node and one or more backup application server nodes. The instructions further cause the one or more processor devices to generate a first response to the initial request, the first response including the prioritization list, and send the first response to the load balancer node.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
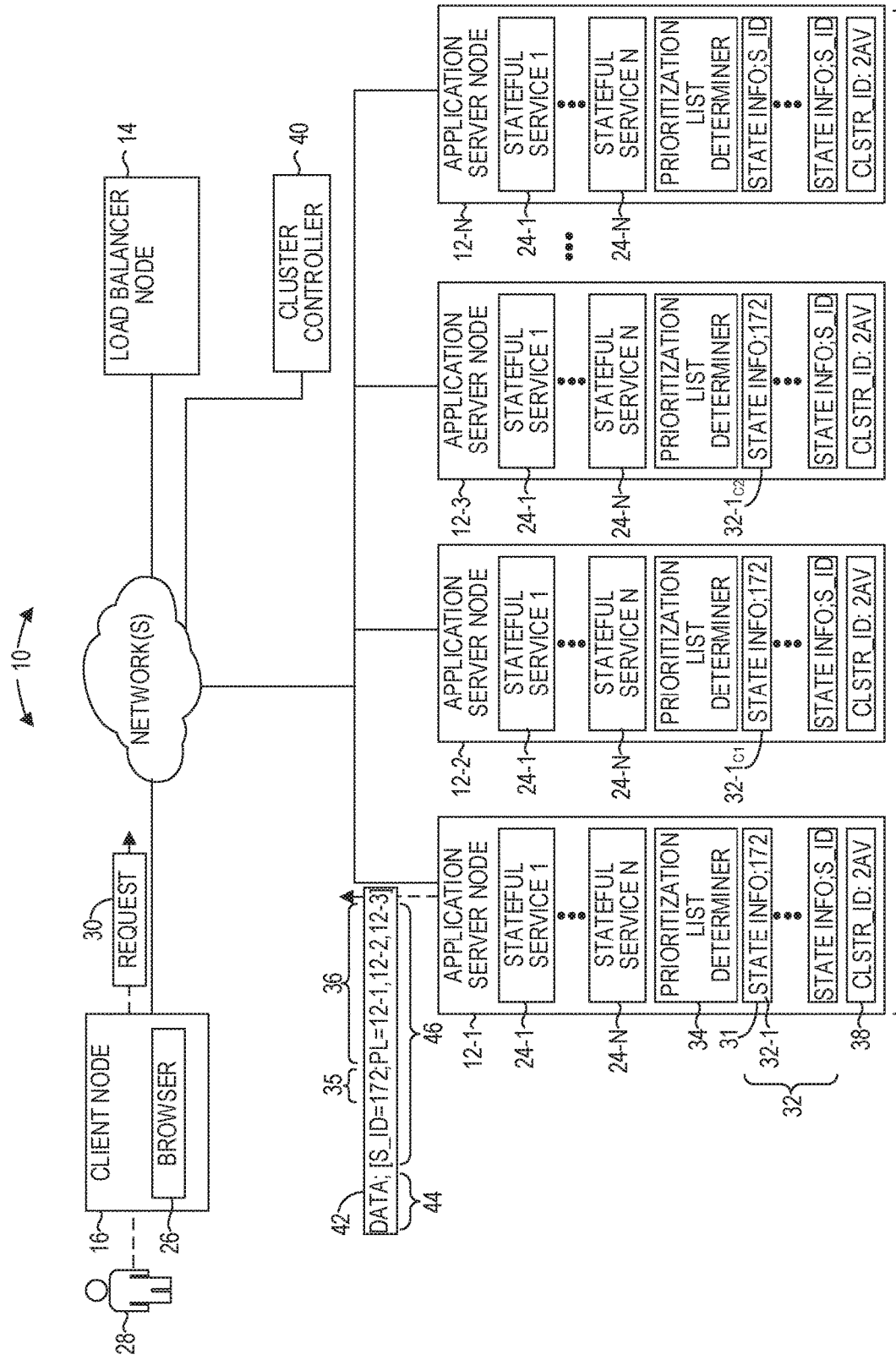
FIG. 1 is a block diagram of an environment in which examples can be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first response" and "second response," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

Load balancer nodes attempt to relatively evenly distribute requests among a plurality of nodes, such as, by way of non-limiting example, application server nodes. Where stateful services are being provided by the application server nodes, a session may be generated by an application server node to thereby maintain state information for the duration of the session. Because successive requests in a session may be serviced by different application server nodes, the state information for a session may be communicated from one application server node to another application server node during the duration of the session.

To reduce the need to communicate state information from application server node to application server node, information that identifies the last application server node that serviced a request is encoded into a session identifier (ID) that accompanies all subsequent requests. This is sometimes referred to as session affinity. A load balancer node can then analyze the session ID of a subsequent request to determine the last application server node that serviced the previous request associated with that session, and route the request to that application server node.

Application server nodes may maintain state information associated with a session, and also distribute the state information to one or more other application server nodes. At times, application server nodes may also temporarily be unavailable to service new requests, such as, for example, during times of heavy processor or memory utilization. Application server nodes may also permanently stop being able to service requests, such as, for example, if one is intentionally removed from a cluster of application server nodes, or if an application server node faults.

Load balancer nodes are typically unaware of which application server nodes have copies of state information from other application server nodes. Thus, in the event that an application server node cannot service a subsequent request associated with a session that was being handled by the application server node, the load balancer node typically simply distributes the request to another application server node that may or may not have a recent copy of the state information. This can result in several inefficiencies. If the load balancer node chooses an application server node that does not have a copy of the state information, the application server node must fetch the state information from some other application server node. Moreover, a single transmission from a client node can result in multiple concurrent requests. If the original application server node is not available, the load balancer node may distribute the multiple concurrent requests to many different application servers, who will then contend for the state information. This can lead to timeouts, and effect scalability.

The examples implement ranked session affinity to improve load balancing efficiency for stateful requests and stateful services. In particular, the examples implement a prioritization list of application server nodes that identifies a primary application server node and one or more backup application server nodes. The load balancer node serves requests associated with a session to the primary application server node if the primary application server node is available. The primary application server node sends updated session information to the other application server nodes that are identified on the prioritization list. If the primary application server node is not available to handle a request, the load balancer node sends the request to the first backup application server node identified on the prioritization list. Because the primary application server node provided the state information to the first backup application server node, the first backup application server node typically has the most recent state information and can service the request without having to obtain the state information. Moreover, the load balancer node sends any concurrent requests associated with the session to the first backup application server node, and thus multiple different application server nodes are not contending for state information. Among other advantages, the examples decrease state information contention and reduce network utilization associated with distributing state information among arbitrary application server nodes. The examples also increase scalability of application server node clusters.

Figure 7:
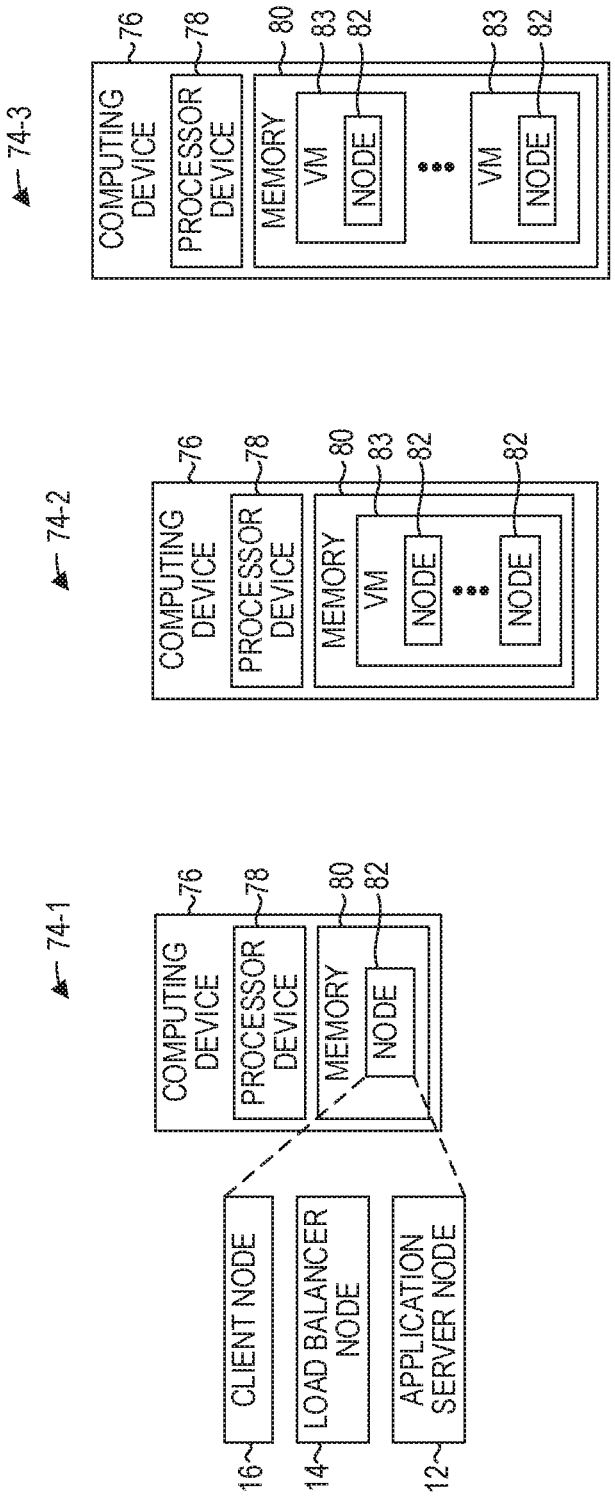
FIGS. 7A-7C are block diagrams of example runtime architectures suitable for implementing the environment 10 according to various examples.

FIG. 1 is a block diagram of an environment 10 in which examples can be practiced. The environment 10 includes a plurality of application server nodes 12-1-12-N (generally, application server nodes 12), at least one load balancer node 14, and a plurality of client nodes 16, only one of which is illustrated for purposes of simplicity. The phrase "node" as used herein refers to addressable functional units (e.g., components) in the environment 10. Any addressing mechanism may be used, such as by IP address, port number, domain name, or any other addressable mechanism for directing communications between nodes. As will be described greater detail with regard to FIG. 7, the nodes are implemented in a runtime architecture that includes one or more computing devices with corresponding processor devices and memories, and in some instances may be implemented in virtualization layers of such computing devices, such as in virtual machines or containers. This runtime architecture is omitted from many of the Figures due to the limited space in the Figures.

The four application server nodes 12 are part of a same cluster 18, and represent those application server nodes 12 to which the load balancer node 14 can send a request received from the client node 16. While for purposes of illustration only four application server nodes 12 are illustrated, a cluster 18 can have any number of application server nodes 12, such as tens, hundreds, or even thousands of application server nodes 12.

The functionality of any of the nodes or other functional blocks disclosed herein may, in some instances, be attributed to a computing device since such nodes are ultimately executed on one or more computing devices, or, in a case where the nodes or other functional blocks are implemented via software instructions, may be attributed to one or more processor devices of the one or more computing devices.

The application server node 12-1 offers one or more stateful services 24-1-24-N (generally, stateful services 24) to the client node 16. The stateful services 24 can be any service that maintains state information between requests from the client node 16. An example of a stateful service 24 is a web server that maintains state for those websites that utilize state. The application server nodes 12-2-12-N also each offer the same stateful services 24-1-24-N. Thus, any of the applications server nodes 12-1-12-N can service a request for a stateful service 24-1-24-N.

The client node 16 may include, for example, a browser 26. A user 28 enters data into the browser 26 which generates an initial request 30 which requests service from the stateful service 24-1. Note that for purposes of illustration only a single request 30 is illustrated, however, the submission of data on a web page via the browser 26 may, at times, result in the generation of multiple requests 30, depending on the logic implemented by the web page.

The load balancer node 14 receives the request 30. The request 30 contains no session affinity information, such as the identity of one or more of the application server nodes 12, because this is an initial request 30 from the browser 26 for the stateful service 24-1. The load balancer node 14 implements a selection mechanism, such as a round robin or other load distribution algorithm, to select an application server node 12 to service the request 30. For purposes of illustration it will be assumed that the load balancer node 14 selects the application server node 12-1 to service the request 30, and forwards the request 30 to the application server node 12-1.

The application server node 12-1 receives the request 30 from the load balancer node 14 and determines that the request 30 is for the stateful service 24-1. The application server node 12-1 examines the request, and determines that the request 30 contains no affinity information that indicates a session has already been established. The application server node 12-1 then establishes a session 31 for use with subsequent communications with the browser 26 that relate to the stateful service 24-1. Each session 31 includes a unique session identifier and may include state information 32 that maintains information about the state of the stateful service 24-1.

In one example, to establish a session 31, a prioritization list determiner 34 generates a unique session identifier (ID) 35, and determines a prioritization list 36 that identifies a set of application server nodes 12 from the plurality of application server nodes 12. The prioritization list 36 can be used by the load balancer node 14 to route subsequent requests from the browser 26 that include the unique session ID 35 to a particular, rather than random, application server node 12 that is identified in the prioritization list 36.

The mechanism or algorithm for determining the prioritization list 36 may differ depending on the particular environment, and any suitable mechanism for determining a set of application server nodes 12 may be used. Moreover, the number of application server nodes 12 in the prioritization list 36 may be any desirable number. In some examples, the number of application server nodes 12 may be configurable.

In one example, the prioritization list determiner 34 uses a hashing algorithm that utilizes a hash wheel to determine the prioritization list 36. The hash wheel includes a plurality of entries, each of which corresponds to one of the application server nodes 12 in the cluster 18. The application server nodes 12 may, for example, be randomly distributed about the hash wheel. The prioritization list determiner 34 hashes the unique session ID 35 to generate an index. The index identifies a particular entry on the hash wheel. The application server node 12 corresponding to that entry is identified as the primary application server node 12, and is placed first in the prioritization list 36. The prioritization list determiner 34 may then proceed clockwise around the hash wheel and select the next X number of entries, where X is the predetermined number of backup application server nodes 12. The prioritization list determiner 34 identifies the next X number of entries as the backup application server nodes 12 in the prioritization list 36. The prioritization list determiner 34 may iteratively generate unique session IDs 35 and hash the unique session IDs 35 until the resulting hashed index identifies an entry on the hash wheel that corresponds to the respective application server node 12 which is handling the request.

In this example, the prioritization list determiner 34 iteratively generates unique session IDs 35 and hashes the unique session IDs 35 until the resulting hashed index identifies an entry on the hash wheel that corresponds to the application server node 12-1. In this example, it will be assumed that X=2, and thus, there are two backup application server nodes 12 for each session 31. It will also be assumed that, for this particular session 31, the prioritization list determiner 34 determines that the application server nodes 12-2 and 12-3 are the backup application server nodes. Note that any application server node 12 may be a primary application server node 12 for some sessions 31, and a backup application server node 12 for other sessions 31.

In some examples, the cluster 18 also has an associated cluster ID 38 that corresponds to a particular cluster 18 at a given point in time. Upon a change to the cluster 18, such as removal of an application server node 12 from the cluster 18, or addition of a new application server node 12 to the cluster 18, a cluster controller 40 assigns a new cluster ID 38 to the cluster 18, and alters the hash wheel to reflect the composition of the new cluster 18. In such examples, the application server nodes 12 may utilize both the session ID 35 and the cluster ID 38 as the input to the hash function to generate an index for the hash wheel.

The application server node 12-1 generates a response 42 to the request 30 (via the stateful service 24-1 in this example) and sends the response 42 to the load balancer node 14 for delivery to the client node 16. The response 42 includes data 44 generated by the stateful service 24-1, and metadata 46 that includes the session ID 35 and the prioritization list 36. The metadata 46 may be maintained, for example, as a header of the response 42, or as a cookie. The load balancer node 14 sends the response 42 to the client node 16.

The application server node 12-1 also maintains state information 32-1 associated with the session ID 35. Based on the prioritization list 36, the application server node 12-1 sends, to the backup application server nodes 12-2, 12-3, the state information 32-1 so that the backup application server nodes 12-2, 12-3 have current backups 32-1$_{C1}$ and 32-1$_{C2}$, respectively, of the state information 32-1 in the event the application server node 12-1 is unable to service a subsequent request from the browser 26 associated with this respective session 31.

Figure 2:
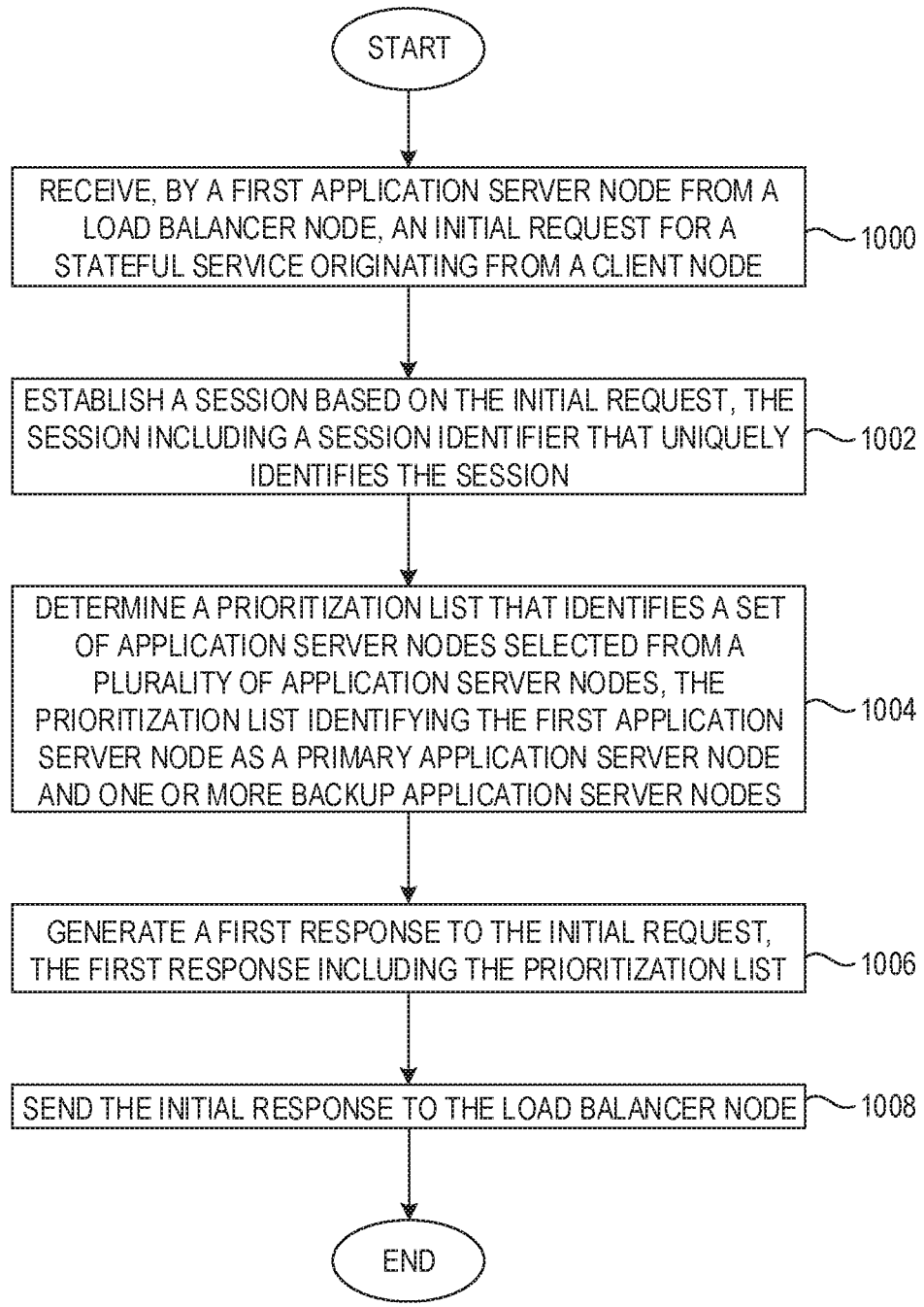
FIG. 2 is a flowchart of a method for ranked session affinity to improve load balancing efficiency for stateful services according to one example.

FIG. 2 is a flowchart of a method for ranked session affinity to improve load balancing efficiency for stateful services according to one example. FIG. 2 will be discussed in conjunction with FIG. 1. The application server node 12-1 receives, from the load balancer node 14, the initial request 30 for the stateful service 24-1 originating from the client node 16 (FIG. 2, block 1000). The application server node 12-1 establishes a session 31 based on the request 30, the session 31 including the session identifier 35 that uniquely identifies the session 31 (FIG. 2, block 1002). The application server node 12-1 determines a prioritization list 36 that identifies a set of application server nodes 12-1, 12-2, and 12-3 selected from the plurality of application server nodes 12. The prioritization list 36 identifies the first application server node 12-1 as a primary application server node 12 and the application server nodes 12-2, 12-3 as backup application server nodes 12 (FIG. 2, block 1004). The application server node 12-1 generates the response 42 to the initial request 30, the response 42 including the prioritization list 36 (FIG. 2, block 1006). The application server node 12-1 sends the response 42 to the load balancer node 14 (FIG. 2, block 1008).

Figure 3:
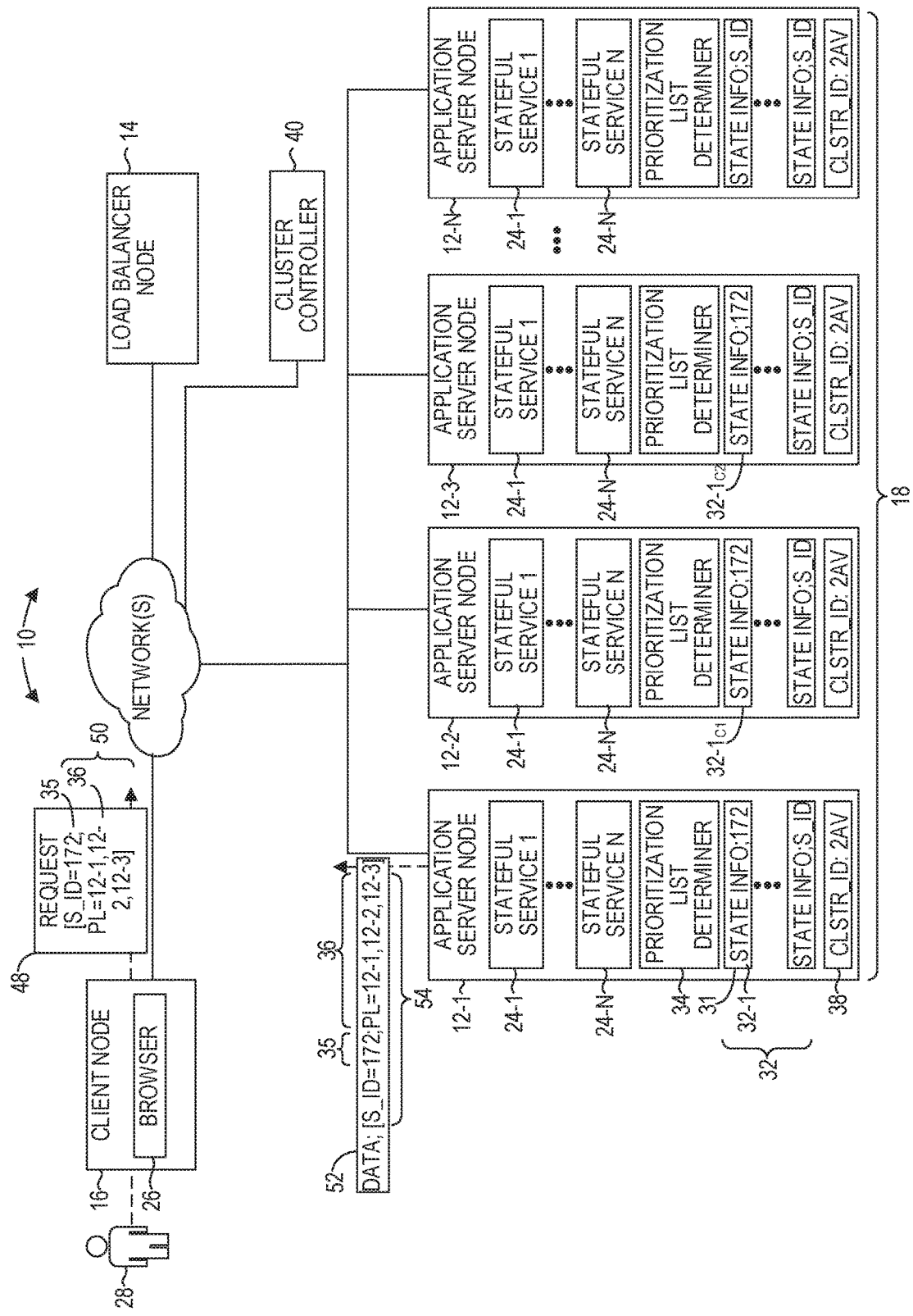
FIG. 3 is a block diagram of the environment illustrated in FIG. 1 at a point in time subsequent to that illustrated in FIG. 1 to illustrate use of a prioritization list according to one example.

FIG. 3 is a block diagram of the environment 10 at a point in time subsequent to that illustrated in FIG. 1. The client node 16 sends a request 48 which requests service from the stateful service 24-1, and which is associated with the session 31 established in response to the request 30 (FIG. 1). The request 48 includes metadata 50 that identifies the session ID 35 received from the application server node 12-1 in response to the request 30, and that identifies the prioritization list 36 received from the application server node 12-1 in response to the request 30. As discussed above, the metadata 50 may comprise, for example, header information, or be contained in a cookie. The load balancer node 14 receives the request 48 from the client node 16, and accesses the prioritization list 36. The load balancer node 14 determines whether or not the primary application server node 12, in this example the application server node 12-1, can service the request 48. There may a number of reasons why the application server node 12-1 may not be able to service the request 48. By way of non-limiting example, the application server node 12-1 may have been intentionally removed from the cluster 18, or may have faulted, or may simply be overloaded and temporarily not able to service requests.

In this example, the load balancer node 14 determines that the application server node 12-1 can service the request 48. The load balancer node 14 sends the request 48 to the application server node 12-1. The application server node 12-1 receives the request 48. In some examples, rather than rely on the prioritization list 36 contained in the request 48, the prioritization list determiner 34 again determines the prioritization list 36 using the session ID 35 and the cluster ID 38. This may also be done because the cluster 18 may have changed in the interval of time between the request 30 (FIG. 1) and the request 48, and thus the prioritization list 36 may have changed. Moreover, regenerating the prioritization list 36 ensures that for each request from the client node 16 associated with the session ID 35, the application server node 12 servicing the request obtains the current state of the prioritization list 36 and is thus aware of the current primary application server node 12, and the current backup application server nodes 12. In this example, the cluster 18 has not changed, and thus the prioritization list determiner 34 determines the same prioritization list 36, wherein the primary application server node 12 is the application server node 12-1, and the backup application server nodes 12 are the application server nodes 12-2, 12-3. Thus, the application server node 12-1 determines that the application server node 12-1 is the primary application server node 12 and has the most recent copy of the state information 32-1.

The application server node 12-1, via the stateful service 24-1, generates a response 52 to the request 48, and sends the response 52 to the load balancer node 14 for delivery to the client node 16. The response 52 includes metadata 54, which includes the session ID 35 and the prioritization list 36.

The application server node 12-1 also updates the state information 32-1 associated with the session ID 35, and based on the prioritization list 36, the application server node 12-1 sends, to the backup application server nodes 12-2, 12-3, the state information 32-1 so that the backup application server nodes 12-2, 12-3 have current backups 32-1$_{C1}$ and 32-1$_{C2}$, respectively, of the state information 32-1 in the event the application server node 12-1 is unable to service a subsequent request from the browser 26 associated with this respective session 31.

It should be noted that the transmission, by the user 28 at the browser 26, may result in multiple concurrent requests for service from the stateful service 24-1, depending on the programming contained in the transmitted web page. In such situation, each separate request would be handled in the same way by the load balancer node 14, such that each of the concurrent requests would be routed to the application server node 12-1 if available, and if not, to the first available application server node 12 identified on the prioritization list 36 that is available to handle a request. In this manner, the number of application server nodes 12 handling requests associated with the session ID 35 are minimized, reducing contention for and the transmission of state information 32 over the network.

Figure 4:
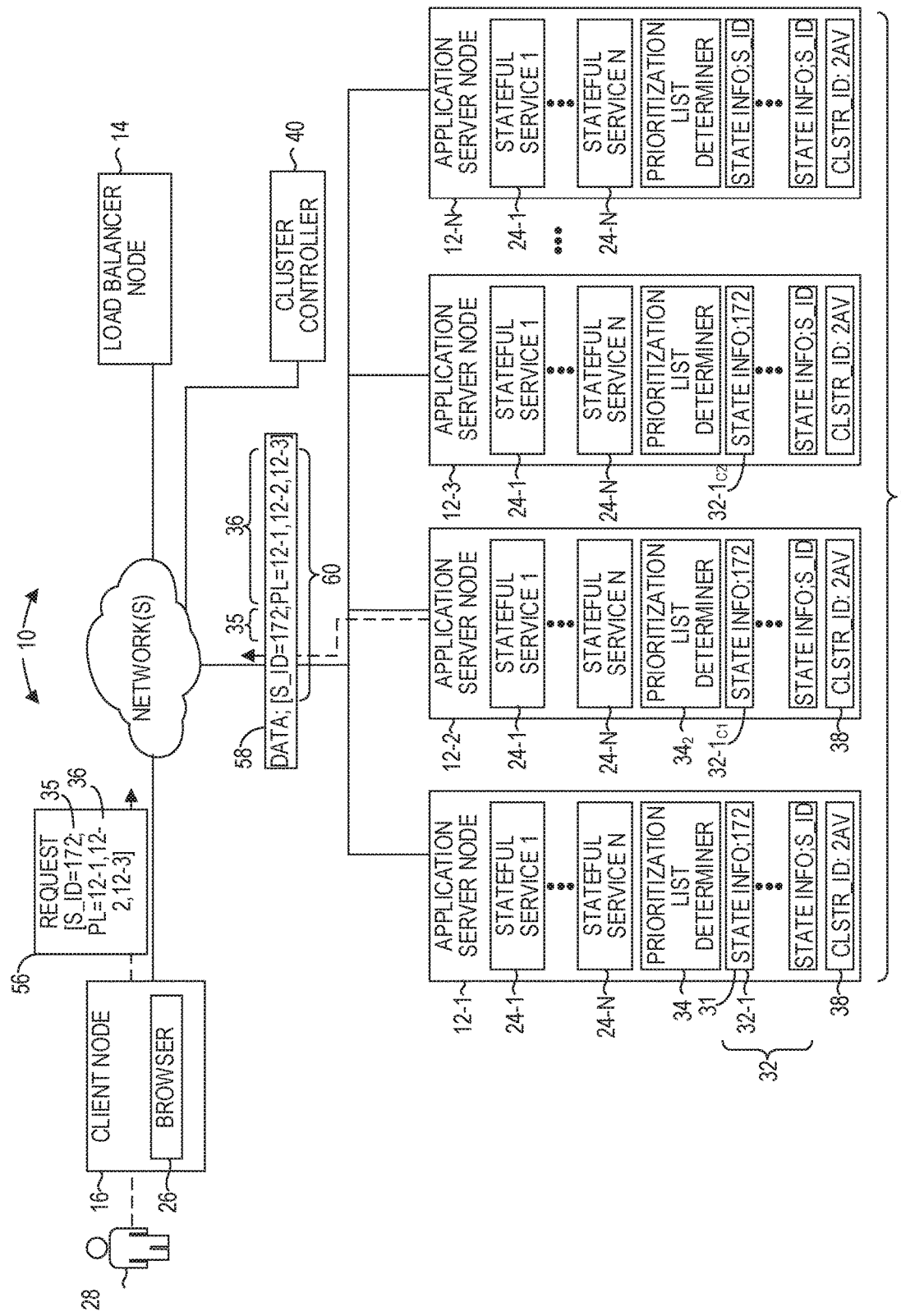
FIG. 4 is a block diagram of the environment illustrated in FIG. 3 at a point in time subsequent to that illustrated in FIG. 3 to illustrate use of a prioritization list according to another example.

FIG. 4 is a block diagram of the environment 10 at a point in time subsequent to that illustrated in FIG. 3 to illustrate use of the prioritization list 36 according to another example. The client node 16 sends a request 56 which requests service from the stateful service 24-1, and which is associated with the session 31 established in response to the request 30 (FIG. 1). The request 56 includes metadata that identifies the session ID 35 received from the application server node 12-1 in response to the request 48 (FIG. 3), and that identifies the prioritization list 36 received from the application server node 12-1 in response to the request 48. As discussed above, the metadata may comprise, for example, header information, or be contained in a cookie. The load balancer node 14 receives the request 56 from the client node 16 and accesses the prioritization list 36. In this example, the load balancer node 14 determines that the primary application server node 12-1 is not available to service the request 56. The load balancer node 14 then ascertains whether the next application server node 12 in the prioritization list 36, in this example the application server node 12-2, can service the request 56. The load balancer node 14 determines that the application server node 12-2 can service the request 56, and sends the request 56 to the application server node 12-2.

The application server node 12-2 receives the request 56. A prioritization list determiner 34$_2$ of the application server node 12-2 utilizes the same algorithm as that used by the prioritization list determiner 34 of the application server node 12-1, and determines the identity of the current primary application server node 12 based on the session ID 35 and the cluster ID 38. This is done, as discussed above, because the cluster 18 could have changed between the response 46 and the request 56 and because the application server node 12-1 may no longer be the current primary application server node 12. Assume for purposes of illustration that the application server node 12-2 determines that the the application server node 12-1 is still the current primary application server node 12.

The application server node 12-2 sends a message to the application server node 12-1 to ensure that the application server node 12-2 contains the most recent version of the state information 32-1, or, to obtain the most recent version of the state information 32-1. The mechanism for determining whether the application server node 12-2 contains the most recent version may be any suitable mechanism, such as, by way of non-limiting example, passing to the application server node 12-1 a version number of the state information 32-1 maintained by the application server node 12-1. If the version number is the same as that of the the application server node 12-1, the application server node 12-1 confirms to the application server node 12-2 that the application server node 12-2 contains the most recent state information 32-1. Another suitable mechanism involves lock acquisition mechanisms. After ensuring that the application server node 12-2 has the most current version of the state information 32-1, the application server node 12-2, via the stateful service 24-1, generates a response 58 to the request 56. The prioritization list determiner $34_2$ then re-calculates the priority list 36. The application server node 12-2 sends the response 58 to the load balancer node 14 for delivery to the client node 16. The response 58 includes metadata 60 which includes the session ID 35 and the re-calculated prioritization list 36. Assume that the cluster 18 has not changed and that the prioritization list determiner $34_2$ determines the same prioritization list 36 as was contained in the request 48.

The application server node 12-2 also updates the state information $32\text{-}1_{C1}$ associated with the session ID 35. The application server node 12-2 sends, to the primary application server node 12-1, the updated state information $32\text{-}1_{C1}$ so that the primary application server node 12-1 has the most recent version of the state information $32\text{-}1_{C1}$. The application server node 12-1 updates the state information 32-1 with the state information $32\text{-}1_{C1}$, and sends copies of the updated state information $32\text{-}1_{C1}$ to the backup application server nodes 12-2, 12-3 so that the backup application server nodes 12-2, 12-3 have the most recent version of the state information 32-1.

Figure 5:
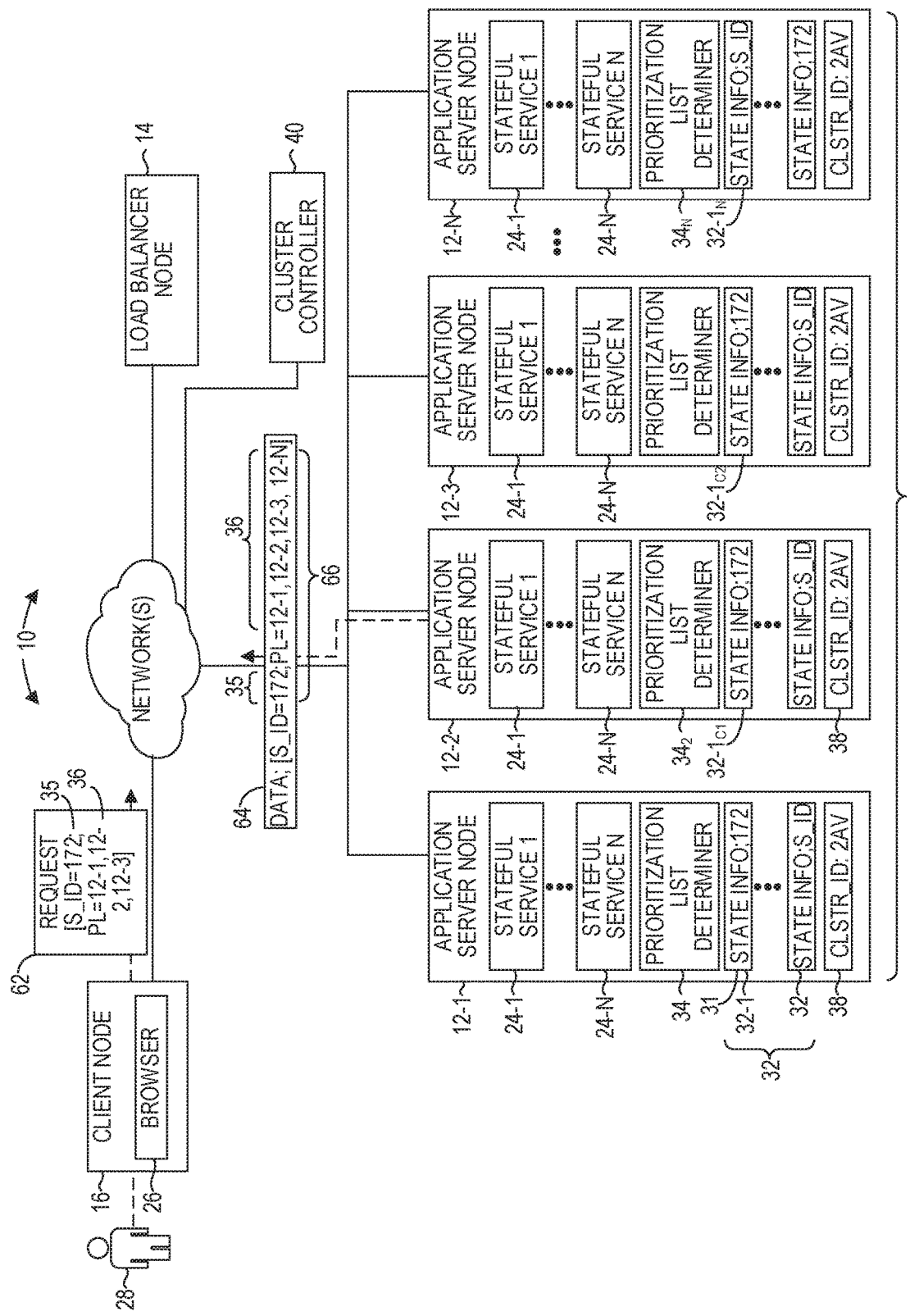
FIG. 5 is a block diagram of the environment illustrated in FIG. 4 at a point in time subsequent to that illustrated in FIG. 4 to illustrate use of a prioritization list according to another example.

FIG. 5 is a block diagram of the environment 10 at a point in time subsequent to that illustrated in FIG. 4 to illustrate use of a prioritization list 36 according to another example. The client node 16 sends a request 62 which requests service from the stateful service 24-1, and which is associated with the session 31 established in response to the request 30 (FIG. 1). The request 62 includes metadata that identifies the session ID 35 received from the application server node 12-1 in response to the request 56 (FIG. 4), and that identifies the prioritization list 36 received from the application server node 12-1 in response to the request 56. The load balancer node 14 receives the request 62 from the client node 16, and accesses the prioritization list 36. In this example, the load balancer node 14 determines that the primary application server node 12-1 is not available to service the request 62 and determines that the backup application server nodes 12-2 or 12-3 are not available to service the request 62. The load balancer node 14 then randomly, or via some other selection mechanism, selects the application server node 12-N to service the request 62, and determines that the application server node 12-N is available to service the request 62. The load balancer node 14 sends the request 62 to the application server node 12-N.

The application server node 12-N receives the request 62. A prioritization list determiner $34_N$ of the application server node 12-N utilizes the same algorithm as that used by the prioritization list determiner 34 of the application server node 12-1 to determine which application server node 12 is the current primary application server node 12 for this session ID 35. The application server node 12-N determines that the application server node 12-1 is the primary application server node 12. The application server node 12-N sends a message to the application server node 12-1 to obtain the most recent version of the state information 32-1.

The application server node 12-N, via the stateful service 24-1, generates a response 64 to the request 62. The prioritization list determiner $34_N$ of the application server node 12-N determines the prioritization list 36, and sends the response 64 to the load balancer node 14 for delivery to the client node 16. The response 64 includes metadata 66 which includes the session ID 35 and the prioritization list 36. In this example, the application server node 12-N may also identify itself in the prioritization list 36 as the most recent application server node 12 that serviced a request for the session ID 35, in the event that the application server nodes 12-1, 12-2, and 12-3 are unable to process a subsequent request from the client node 16 associated with the session ID 35.

The application server node 12-N also updates state information $32\text{-}1_N$ associated with the session ID 35, and, based on the prioritization list 36, the application server node 12-N sends, to the primary application server node 12-1, the updated state information $32\text{-}1_N$ so that the primary application server node 12-1 has the most recent version of the state information $32\text{-}1_N$. The application server node 12-1 updates the state information 32-1 with the state information $32\text{-}1_N$, and sends copies of the updated state information 32-1 to the backup application server nodes 12-2, 12-3 so that the backup application server nodes 12-2, 12-3 have the most recent version of the state information 32-1.

Figure 6:
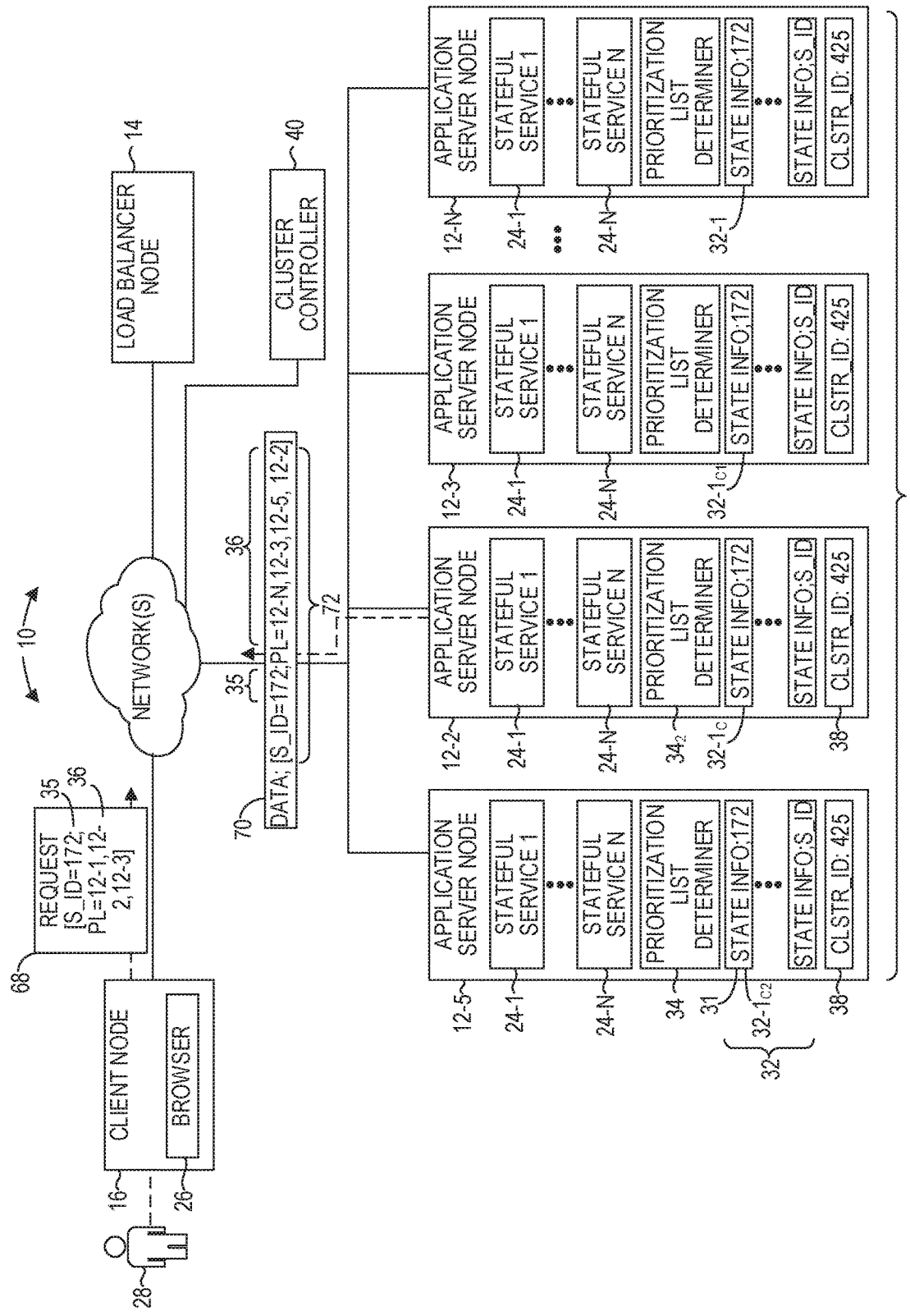
FIG. 6 is a block diagram of the environment illustrated in FIG. 5 at a point in time subsequent to that illustrated in FIG. 5 to illustrate use of a prioritization list after a cluster has changed, according to another example.

FIG. 6 is a block diagram of the environment 10 illustrated in FIG. 5 at a point in time subsequent to that illustrated in FIG. 5. In this example, at a point in time after the application server node 12-N sent the response 64 (FIG. 5), the application server node 12-1 was removed from the cluster 18. A new application server node 12-5 was added to the cluster 18. The cluster controller 40 altered the hash wheel discussed above accordingly, by removing any entries of the application server node 12-1 from the hash wheel, and adding one or more entries that correspond to the application server node 12-5 to the hash wheel. The cluster controller 40 also generated a new cluster ID 38 ("425").

The client node 16 sends a request 68 which requests service from the stateful service 24-1, and which is associated with the session 31 established in response to the initial request 30 (FIG. 1). The request 68 includes metadata that identifies the session ID 35 received from the application server node 12-N in the response 64 to the request 62 (FIG. 3), and that identifies the prioritization list 36 received from the application server node 12-1 in the response 64 to the request 62. The load balancer node 14 receives the request 68 from the client node 16, and accesses the prioritization list 36. In this example, the load balancer node 14 determines that the primary application server node 12-1 is not available to service the request 68 because the application server node 12-1 is no longer part of the cluster 18. The load balancer node 14 then ascertains whether the next application server node 12 in the prioritization list 36, in this example, the application server node 12-2, can service the request 68. The load balancer node 14 determines that the application server node 12-2 can service the request 68, and sends the request 68 to the application server node 12-2.

The application server node 12-2 receives the request 68. The prioritization list determiner $34_2$ of the application server node 12-2 utilizes the same algorithm as that used by the prioritization list determiner 34 of the application server node 12-1 and, using the session ID 35 and the new cluster ID 38, determines that the application server node 12-N is the primary application server node 12. The application server node 12-2 sends a request to the application server node 12-N for a most recent version of the state information 32 associated with the session ID 35. The application server node 12-N provides a copy of the current state information 32 to the application server node 12-2.

In some examples, upon a controlled change in the cluster 18, such as the intentional removal of the application server node 12-1, the cluster controller 40, or another node, for each session 31 maintained on the application server node 12-1, determines a new prioritization list 36 for each session 31 for which the application server node 12-1 was the primary application server node 12, and provides the current state information 32 stored on the application server node 12-1 to the new primary application server node 12 for each session 31. Thus, in this example, the application server node 12-N may have previously been provided the state information 32 associated with the session ID 35. In other examples, the application server node 12-N, upon a first request for state information 32 associated with the session ID 35, determines that it is now the primary application server node 12 for the session ID 35, and obtains the current state information 32 associated with the session ID 35 from a state information store on which the current state information 32 was previously stored.

The application server node 12-2, via the stateful service 24-1, generates a response 70 to the request 68. The prioritization list determiner $34_2$ of the application server node 12-2 determines a different prioritization list 36 than the prioritization list 36 identified in the request 68 due to the change in the cluster ID 38. In this example, the new prioritization list 36 identifies the application server node 12-N as the primary application server node 12 and the application server nodes 12-3, 12-5 as backup application server nodes 12.

The application server node 12-2 sends the response 70 to the load balancer node 14 for delivery to the client node 16. The response 70 includes metadata 72 which includes the session ID 35 and the new prioritization list 36 that identifies the application server node 12-N as the primary application server node 12, and the application server nodes 12-3, 12-5 as backup application server nodes 12. The application server node 12-2 may also identify itself in the new prioritization list 36 as the most recent application server node 12 that serviced a request for the session ID 35, in the event that the application server nodes 12-N, 12-3, and 12-5 are unable to process a subsequent request from the client node 16 associated with the session ID 35.

The application server node 12-2 also updates the state information 32-1c associated with the session ID 35, and, based on the prioritization list 36, the application server node 12-2 sends, to the primary application server node 12-N, the updated state information $32\text{-}1_c$ so that the primary application server node 12-N has the most recent version of the state information 32-1. The application server node 12-N updates the state information 32-1 with the state information $32\text{-}1_c$, and sends copies of the updated state information 32-1 to the backup application server nodes 12-3, 12-5 so that the backup application server nodes 12-3, 12-5 have the most recent version of the state information 32-1.

FIGS. 7A-7C are block diagrams of example runtime architectures suitable for implementing the environment 10 according to various examples. FIG. 7A illustrates a runtime architecture 74-1 wherein a computing device 76 includes a processor device 78 and a memory 80. The memory 80 includes a node 82 that represents the client node 16, the load balancer node 14, or any of the application server nodes 12. The node 82 includes executable instructions that implement the functionality for the respective client node 16, the load balancer node 14, or any of the application server nodes 12, as discussed above, and corresponding data generated and/or otherwise utilized by the respective client node 16, the load balancer node 14, or any of the application server nodes 12, also as discussed above.

FIG. 7B illustrates a runtime architecture 74-2 that is substantially similar to that discussed above with regard to FIG. 7A, except that a virtualization layer, in particular a virtual machine 83, executes one or more of the nodes 82, such as one or more of the client node 16, the load balancer node 14, or any of the application server nodes 12.

FIG. 7C illustrates a runtime architecture 74-3 that is substantially similar to that discussed above with regard to FIG. 7B, except that multiple virtual machines 83 are used to execute one or more of the nodes 82, such as one or more of the client node 16, the load balancer node 14, or any of the application server nodes 12.

It should be noted that FIGS. 7A-7C merely illustrate some runtime architectures suitable for implementing the examples disclosed herein, and the examples are not limited to any particular runtime architecture. It is also noted that the examples can be implemented via any combination of the runtime architectures illustrated in FIGS. 7A-7C. Moreover, additional and/or different virtualization technologies may be utilized, including, by way of non-limiting example, container virtualization technologies.

Figure 8:
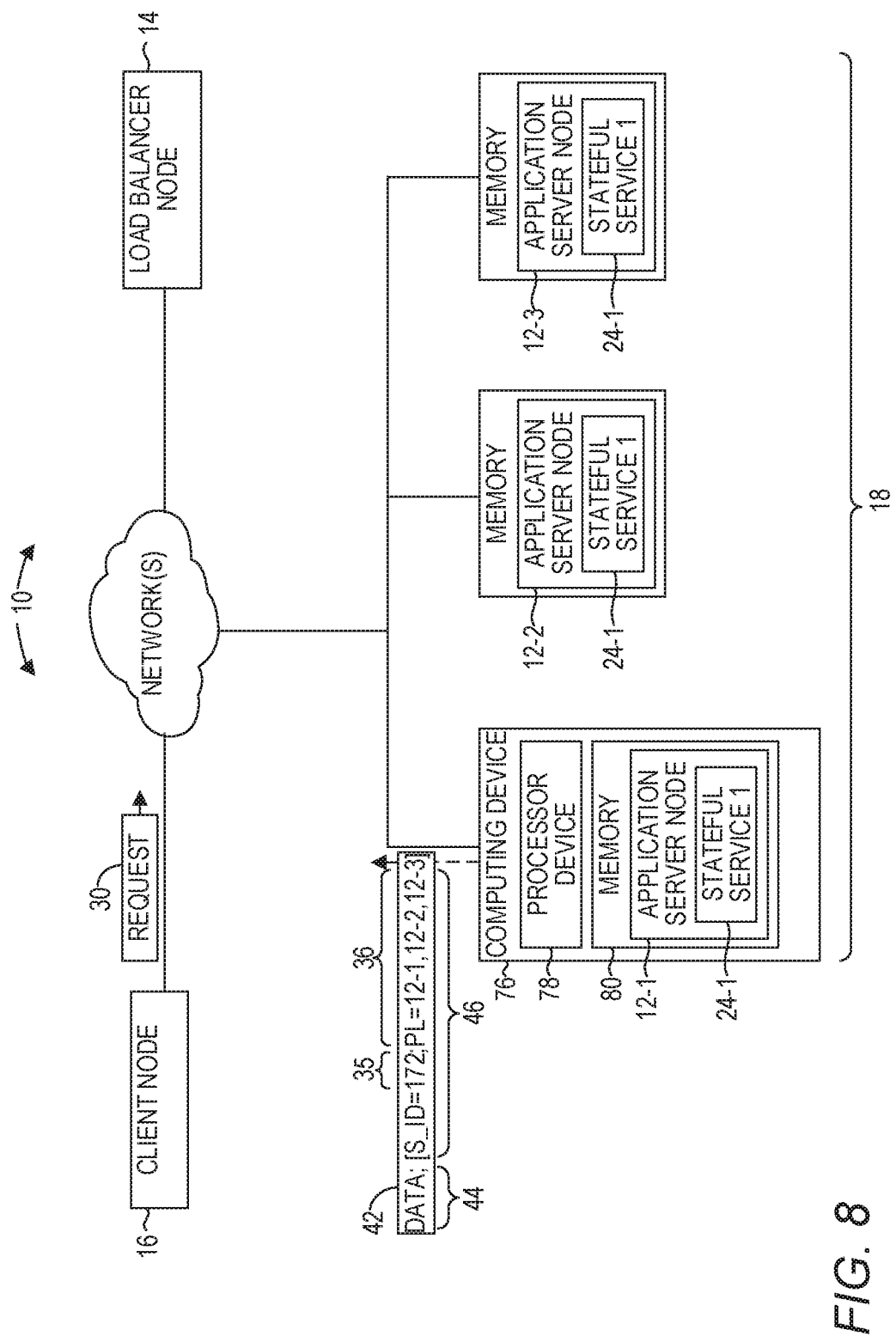
FIG. 8 is a simplified block diagram of the environment illustrated in FIG. 1.

FIG. 8 is a simplified block diagram of the environment 10 illustrated in FIG. 1. In this example, the application server node 12-1 is implemented in the runtime architecture illustrated in FIG. 7A, and thus is implemented on the computing device 76. Because the application server node 12-1, in this example, is a component of the computing device 76, and includes software instructions that program the processor device 78 in a novel manner, the functionality of the application server node 12-1 may be attributed to the processor device 78. The processor device 78 receives, from the load balancer node 14, the initial request 30 for the stateful service 24-1 originating from the client node 16. The processor device 78 establishes a session 31 based on the initial request 30. The session 31 includes the session identifier 35 that uniquely identifies the session 31. The processor device 78 determines the prioritization list 36 that identifies the set of application server nodes 12-1, 12-2, 12-3 selected from the plurality of application server nodes 12. The prioritization list 36 identifies the application server node 12-1 as the primary application server node 12 and the application server nodes 12-2, 12-3 as the one or more backup application server nodes 12. The processor device 78 generates the first response 42 to the initial request 30, the first response 42 including the prioritization list 36, and sends the first response 42 to the load balancer node 14.

Figure 9:
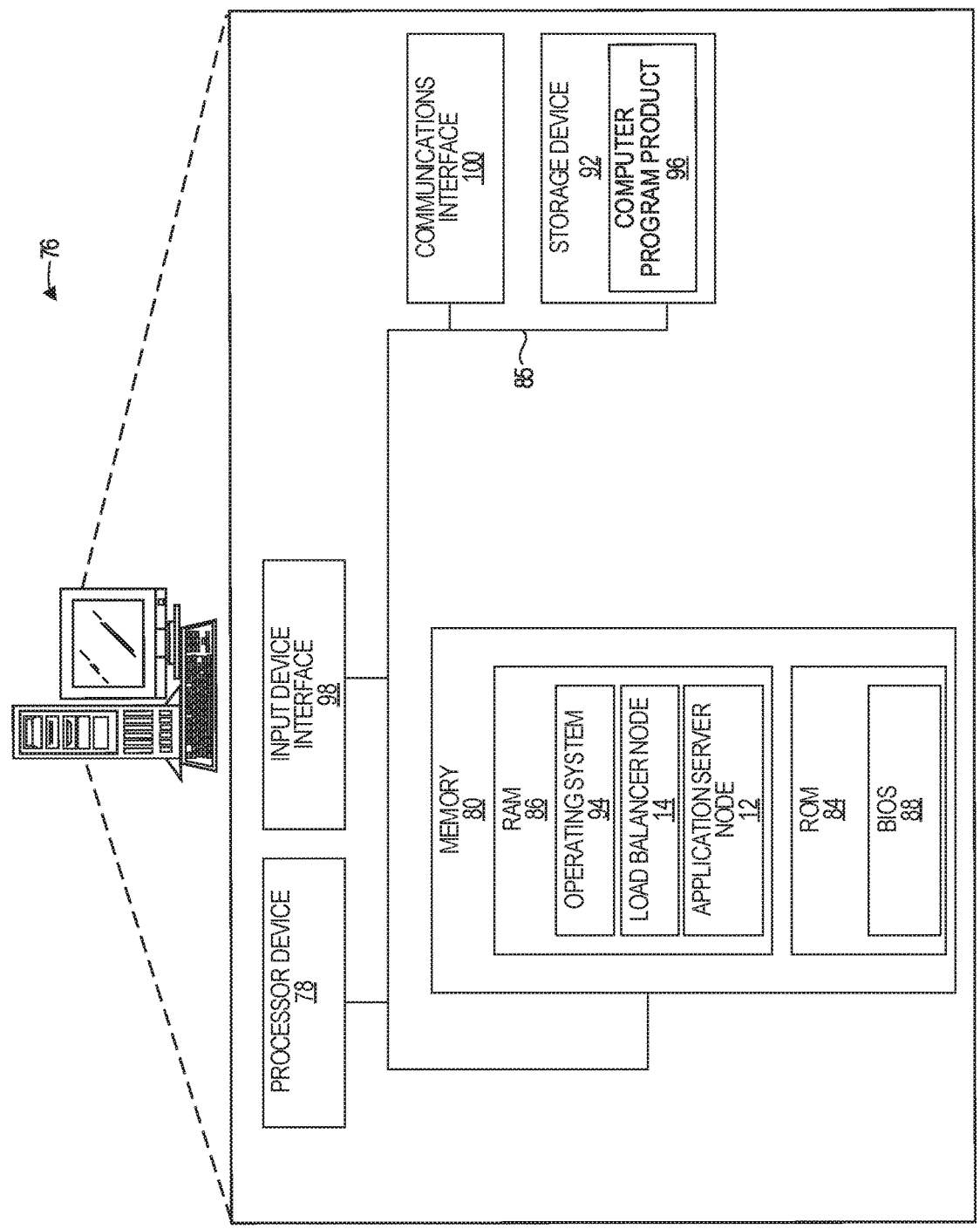
FIG. 9 is a block diagram of a computing device suitable for implementing the examples.

FIG. 9 is a block diagram of the computing device 76 suitable for implementing any of the nodes 16, 14, and 12-1-12-N, as illustrated in FIGS. 7A-7C, discussed herein. The computing device 76 may comprise any computing or electronic device capable of including firmware, hardware, and/or executing software instructions to implement the functionality described herein, such as a computer server, a desktop computing device, a laptop computing device, or the like. The computing device 76 includes the processor device 78, the memory 80, and a system bus 85. The system bus 85 provides an interface for system components including, but not limited to, the memory 80 and the processor device 78. The processor device 78 can be any commercially available or proprietary processor.

The system bus 85 may be any of several types of bus structures that may further interconnect to a memory bus (with or without a memory controller), a peripheral bus, and/or a local bus using any of a variety of commercially available bus architectures. The memory 80 may include non-volatile memory 84 (e.g., read-only memory (ROM), erasable programmable read-only memory (EPROM), electrically erasable programmable read-only memory (EEPROM), etc.), and volatile memory 86 (e.g., random-access memory (RAM)). A basic input/output system (BIOS) 88 may be stored in the non-volatile memory 84 and can include the basic routines that help to transfer information between elements within the computing device 76. The volatile memory 86 may also include a high-speed RAM, such as static RAM, for caching data.

The computing device 76 may further include or be coupled to a non-transitory computer-readable storage medium such as a storage device 92, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 92 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 92 and in the volatile memory 86, including an operating system 94 and one or more nodes, such as the load balancer node 14, or the application server node 12, which may implement the functionality described herein in whole or in part.

All or a portion of the examples may be implemented as a computer program product 96 stored on a transitory or non-transitory computer-usable or computer-readable storage medium, such as the storage device 92, which includes complex programming instructions, such as complex computer-readable program code, to cause the processor device 78 to carry out the steps described herein. Thus, the computer-readable program code can comprise software instructions for implementing the functionality of the examples described herein when executed on the processor device 78. The processor device 78, in conjunction with the load balancer node 14 or the application server node 12 in the volatile memory 86, may serve as a controller, or control system, for the computing device 76 that is to implement the functionality described herein.

A user may also be able to enter one or more configuration commands through a keyboard (not illustrated), a pointing device such as a mouse (not illustrated), or a touch-sensitive surface such as a display device. Such input devices may be connected to the processor device 78 through an input device interface 98 that is coupled to the system bus 85 but can be connected by other interfaces such as a parallel port, an Institute of Electrical and Electronic Engineers (IEEE) 1394 serial port, a Universal Serial Bus (USB) port, an IR interface, and the like.

The computing device 76 may also include a communications interface 100 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a first application server node from a load balancer node, an initial request for a stateful service originating from a client node;
   establishing a session based on the initial request;
   iteratively:
      generating a session identifier (ID) that uniquely identifies the session;
      hashing the session ID to generate a hashed index; and
      indexing a hash wheel comprising a plurality of entries using the hashed index to identify an entry of the hash wheel, each entry corresponding to a different application server node of the plurality of application server nodes;
   until the hashed index identifies the entry of the hash wheel that corresponds to the first application server node;
   determining, based on the hashed index that identifies the entry of the hash wheel that corresponds to the first application server node and based on the hash wheel, a prioritization list that identifies a set of application server nodes selected from the plurality of application server nodes, the prioritization list identifying the first application server node as a primary application server node and one or more backup application server nodes;
   generating a first response to the initial request, the first response including the prioritization list; and
   sending the first response to the load balancer node.

2. The method of claim 1 further comprising:
   receiving, by the load balancer node, the first response; and
   sending the first response to the client node.

3. The method of claim 1 further comprising:
   storing, in a memory, state information that corresponds to the session ID and identifies a current state of the session; and
   sending, to each backup application server node in the prioritization list, the state information.

4. The method of claim 3 further comprising:
   receiving, by the load balancer node, a second request from the client node, the second request including the prioritization list;
   accessing, by the load balancer node, the prioritization list; and
   based on the prioritization list, sending the second request to the first application server node.

5. The method of claim 4 further comprising:
   receiving, by the first application server node, the second request;
   generating a second response to the second request, the second response including the prioritization list;
   based on the second request, updating the state information that corresponds to the session ID to generate updated state information;
   sending the second response to the load balancer node; and
   sending, to each backup application server node in the prioritization list, the updated state information.

6. The method of claim 1 wherein the prioritization list identifies a second application server node as a first backup application server node, and further comprising:
   receiving, by the load balancer node, a second request from the client node, the second request including the prioritization list;
   accessing, by the load balancer node, the prioritization list;
   determining that the first application server node is unavailable to process requests from the load balancer node; and
   based on the prioritization list, sending the second request to the second application server node.

7. The method of claim 6 further comprising:
receiving, by the second application server node, the second request;
determining that the first application server node is the primary application server node;
generating a second response to the second request, the second response including the prioritization list;
based on the second request, updating state information that corresponds to the session ID to generate updated state information;
sending the second response to the load balancer node; and
sending, to the primary application server node, the updated state information.

8. The method of claim 6 further comprising:
receiving, by the second application server node, the second request;
determining a new prioritization list, the new prioritization list differing from the prioritization list and identifying a third application server node as the primary application server node;
generating a second response to the second request, the second response including the new prioritization list in place of the prioritization list;
based on the second request, updating state information that corresponds to the session ID to generate updated state information;
sending the second response to the load balancer node; and
sending, to the third application server node, the updated state information.

9. The method of claim 8 further comprising adding, to the new prioritization list, the second application server node.

10. The method of claim 1 further comprising:
receiving, by the load balancer node, a plurality of additional requests from the client node, each of the plurality of additional requests including the prioritization list;
accessing, by the load balancer node, the prioritization list for each of the plurality of additional requests; and
based on the prioritization list, sending each of the plurality of additional requests to the first application server node.

11. The method of claim 1 further comprising:
receiving, by the load balancer node, a second request from the client node, the second request including the prioritization list;
accessing, by the load balancer node, the prioritization list;
determining that each application server node identified on the prioritization list is unavailable to process the second request; and
sending the second request to an application server node that is not identified on the prioritization list.

12. The method of claim 11 further comprising:
receiving, by the application server node that is not identified on the prioritization list, the second request;
determining, based at least in part on the session ID, the prioritization list;
determining that the first application server node is the primary application server node based on the prioritization list;
requesting, from the first application server node, state information that corresponds to the session ID;
receiving, from the first application server node, the state information that corresponds to the session ID;
generating a second response to the second request, the second response including the prioritization list;
based on the second request, updating the state information that corresponds to the session ID to generate updated state information;
sending the second response to the load balancer node; and
sending, to the first application server node, the updated state information.

13. The method of claim 1 further comprising:
receiving, by the load balancer node, a second request from the client node, the second request including the prioritization list;
accessing, by the load balancer node, the prioritization list;
determining that the first application server node is unavailable to process requests from the load balancer node;
based on the prioritization list, determining a first available backup server node from the one or more backup application server nodes; and
sending the second request to the first available backup server node.

14. A system, comprising:
one or more computing devices, each computing device comprising a memory and a processor device coupled to the memory; and
the processor device of one of the one or more computing devices to:
receive, by a first application server node from a load balancer node, an initial request for a stateful service originating from a client node;
establish a session based on the initial request;
iteratively:
generate a session identifier (ID) that uniquely identifies the session;
hash the session ID to generate a hashed index; and
index a hash wheel comprising a plurality of entries using the hashed index to identify an entry of the hash wheel, each entry corresponding to a different application server node of the plurality of application server nodes;
until the hashed index identifies the entry of the hash wheel that corresponds to the first application server node;
determine, based on the hashed index that identifies the entry of the hash wheel that corresponds to the first application server node and based on the hash wheel, a prioritization list that identifies a set of application server nodes selected from the plurality of application server nodes, the prioritization list identifying the first application server node as a primary application server node and one or more backup application server nodes;
generate a first response to the initial request, the first response including the prioritization list; and
send the first response to the load balancer node.

15. The system of claim 14 wherein the processor device of the one of the one or more computing devices is further to:
store, in the memory, state information that corresponds to the session ID and identifies a current state of the session; and
send, to each backup application server node in the prioritization list, the state information.

16. The system of claim 14 wherein the prioritization list identifies a second application server node as a first backup application server node, and wherein the processor device of the one of the one or more computing devices is further to:

receive, by the load balancer node, a second request from the client node, the second request including the prioritization list;

access, by the load balancer node, the prioritization list;

determine that the first application server node is unavailable to process requests from the load balancer node; and based on the prioritization list, send the second request to the second application server node.

17. The computing device of claim 16 wherein the processor device of the one of the one or more computing devices is further to:

receive, by the second application server node, the second request;

determine that the first application server node is the primary application server node;

generate a second response to the second request, the second response including the prioritization list;

based on the second request, update state information that corresponds to the session ID to generate updated state information;

send the second response to the load balancer node; and send, to the primary application server node, the updated state information.

18. A computer program product stored on one or more non-transitory computer-readable storage mediums and including instructions to cause one or more processor devices to:

receive, by a first application server node from a load balancer node, an initial request for a stateful service originating from a client node;

establish a session based on the initial request;

iteratively:

generate a session identifier (ID) that uniquely identifies the session;

hash the session ID to generate a hashed index; and index a hash wheel comprising a plurality of entries using the hashed index to identify an entry of the hash wheel, each entry corresponding to a different application server node of the plurality of application server nodes;

until the hashed index identifies the entry of the hash wheel that corresponds to the first application server node;

determine, based on the hashed index that identifies the entry of the hash wheel that corresponds to the first application server node and based on the hash wheel, a prioritization list that identifies a set of application server nodes selected from the plurality of application server nodes, the prioritization list identifying the first application server node as a primary application server node and one or more backup application server nodes;

generate a first response to the initial request, the first response including the prioritization list; and send the first response to the load balancer node.

19. The computer program product of claim 18 wherein the instructions further cause the one or more processor devices to:

store, in a memory, state information that corresponds to the session ID and identifies a current state of the session; and send, to each backup application server node in the prioritization list, the state information.

20. The computer program product of claim 18 wherein the prioritization list identifies a second application server node as a first backup application server node, and wherein the instructions further cause the one or more processor devices to:

receive, by the load balancer node, a second request from the client node, the second request including the prioritization list;

access, by the load balancer node, the prioritization list;

determine that the first application server node is unavailable to process requests from the load balancer node; and based on the prioritization list, send the second request to the second application server node.

21. The computer program product of claim 20 wherein the instructions further cause the one or more processor devices to:

receive, by the second application server node, the second request;

determine that the first application server node is the primary application server node;

generate a second response to the second request, the second response including the prioritization list;

based on the second request, update state information that corresponds to the session ID to generate updated state information;

send the second response to the load balancer node; and send, to the primary application server node, the updated state information.

* * * * *